United States Patent
Otaki

(10) Patent No.: US 6,657,787 B1
(45) Date of Patent: Dec. 2, 2003

(54) CONTRAST IMPROVEMENT OPTICAL APPARATUS AND METHOD

(75) Inventor: Tatsuro Otaki, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/237,440

(22) Filed: Jan. 26, 1999

(30) Foreign Application Priority Data

Jan. 26, 1998 (JP) ............................... 10-027742

(51) Int. Cl.⁷ .................................................. G02B 27/10
(52) U.S. Cl. .................................................... 359/618
(58) Field of Search ............................... 359/618, 362, 359/368, 370, 372, 385, 237, 625, 626, 630, 240, 242, 245, 256, 308, 315

(56) References Cited

U.S. PATENT DOCUMENTS 4,200,353 A * 4/1980 Hoffman .................. 359/370
4,561,731 A * 12/1985 Kley ........................... 349/1
5,572,359 A * 11/1996 Otaki et al. ............... 359/386

OTHER PUBLICATIONS

"Resolution of the Digital Image" by Shinya Inoue, Video Microscopy, pp.v, 334–339 (Jun. 1989).

* cited by examiner

Primary Examiner—Hung Xuan Dang
Assistant Examiner—Joseph Martinez

(57) ABSTRACT

An optical apparatus (10) and method for improving the contrast in an image-forming optical apparatus. The optical apparatus of the invention comprises an illumination optical system (26) for illuminating an object (O). An objective optical system (42) is located adjacent the object and has a transform plane (28). A pupil modulation filter F is arranged at the transform plane and has a transmittance distribution which can be varied from a first transmission distribution (T1) to a second transmission distribution (T2) so that first and second images (I1, I2) can be formed at an image plane (14). A detector (54) is located at the image plane and detects the first and second images. An image synthesizer (58) electrically connected to the detector synthesizes a contrast-improved image from the first and second images.

24 Claims, 4 Drawing Sheets

CONTRAST IMPROVEMENT OPTICAL APPARATUS AND METHOD

FIELD OF THE INVENTION

The present invention relates to an optical apparatus having a contrast improvement function and to a contrast improvement method, and more particularly relates to contrast improvement of an image in optical equipment such as microscopes, cameras and the like.

BACKGROUND OF THE INVENTION

It is known in the art of optics that the contrast in the images formed by optical apparatus can be improved by inserting a filter having a particular transmittance distribution in the pupil (i.e., Fourier) plane of the apparatus. Such a technique is discussed, for example, in the book *Theory of Fourier Imaging*, by Teruji Ose, published by Kyoritsu Shuppan, 1979, on pages 98–107. This contrast improvement method works by tailoring the optical transfer function (OTF) of the optical system to be applicable to the spatial frequency of interest.

A problem with this technique, however, is that certain objects (e.g., specimens in a microscope) have features with many different spatial frequencies. Thus, while contrast is improved at certain spatial frequencies, the contrast at other spatial frequencies is degraded.

SUMMARY OF THE INVENTION

The present invention relates to an optical apparatus having a contrast improvement function and to a contrast improvement method, and more particularly relates to contrast improvement of an image in optical equipment such as microscopes, cameras and the like.

The present invention takes into consideration the aforementioned problem, and has the objective to provide an optical apparatus having a contrast improvement function, and a contrast improvement method that can improve the contrast for specific frequency characteristics as well as overall image characteristics.

Accordingly, a first aspect of the invention is an optical apparatus capable of providing a contrast-improved image of an object. The apparatus comprises an illumination optical system including a light source that condenses light from the light source to illuminate the object. Adjacent the illumination system is an objective optical system having a transform plane and an image plane. A pupil modulating filter is arranged at the transform plane and has a transmittance distribution capable of being varied from a first transmittance distribution to a second transmittance distribution so as to respectively form first and second images at the image plane. A detector is located at the image plane to detect the first and second images. Electrically connected to the detector is an image synthesizer for synthesizing the first and second images to form the contrast-improved image.

A second aspect of the invention is the optical system as described above, wherein the pupil modulation filter comprises a first filter having the first transmittance distribution and a second filter having the second transmittance distribution. The pupil modulation filter is designed such that the first and second filters may be selectively arranged in the transform plane.

A third aspect of the invention is a method of improving the contrast of an image of an object in an image-forming optical apparatus having a transform plane and an image plane. The method comprises the steps of first illuminating the object and forming a first image of the object at the image plane. This is achieved by passing light from the object through the optical apparatus and through a first transmittance distribution created at the transform plane. The next step is detecting and storing the first image. The next step is forming a second image of the object at the image plane by passing light from the object through the optical apparatus and through a second transmittance distribution created at the transform plane. The next step is detecting and storing the second image. Then, the final step is synthesizing the first and second images to form the contrast-improved image.

DETAILED DESCRIPTION OF THE INVENTION

The present invention relates to an optical apparatus having a contrast improvement function and to a contrast improvement method, and more particularly relates to contrast improvement of an image in optical equipment such as microscopes, cameras or the like.

Briefly, the present invention effects modulation of the transmittance distribution at the aperture position (i.e., the Fourier transform plane, which is the pupil plane in an objective lens) in an optical system for condensing light from an object and forming an object image. Specifically, modulation is effected from a first transmittance distribution state wherein light from the object is transmitted according to a first transmittance distribution to a second transmittance distribution state wherein light from the object is transmitted according to a second transmittance distribution that differs from the first transmittance distribution. Then, the image obtained through the optical system in the first transmittance distribution state and the image obtained through the optical system in the second transmittance distribution state are synthesized.

In the image obtained through the optical system in the first transmittance distribution state, the contrast in the first spatial frequency range is improved, but the contrast at other spatial frequencies is degraded. In the image obtained through the optical system in the second transmittance distribution state, the contrast in the second spatial frequency range is improved, but the contrast at other spatial frequencies is degraded. By setting each transmittance distribution so that, for example, the first spatial frequency range and the second spatial frequency range do not substantially overlap, the present invention can obtain a synthesized image with improved contrast across the entire spatial frequency range. As a result, the present invention can improve the contrast for specific frequency characteristics as well as for the overall image characteristics.

Figure 1:
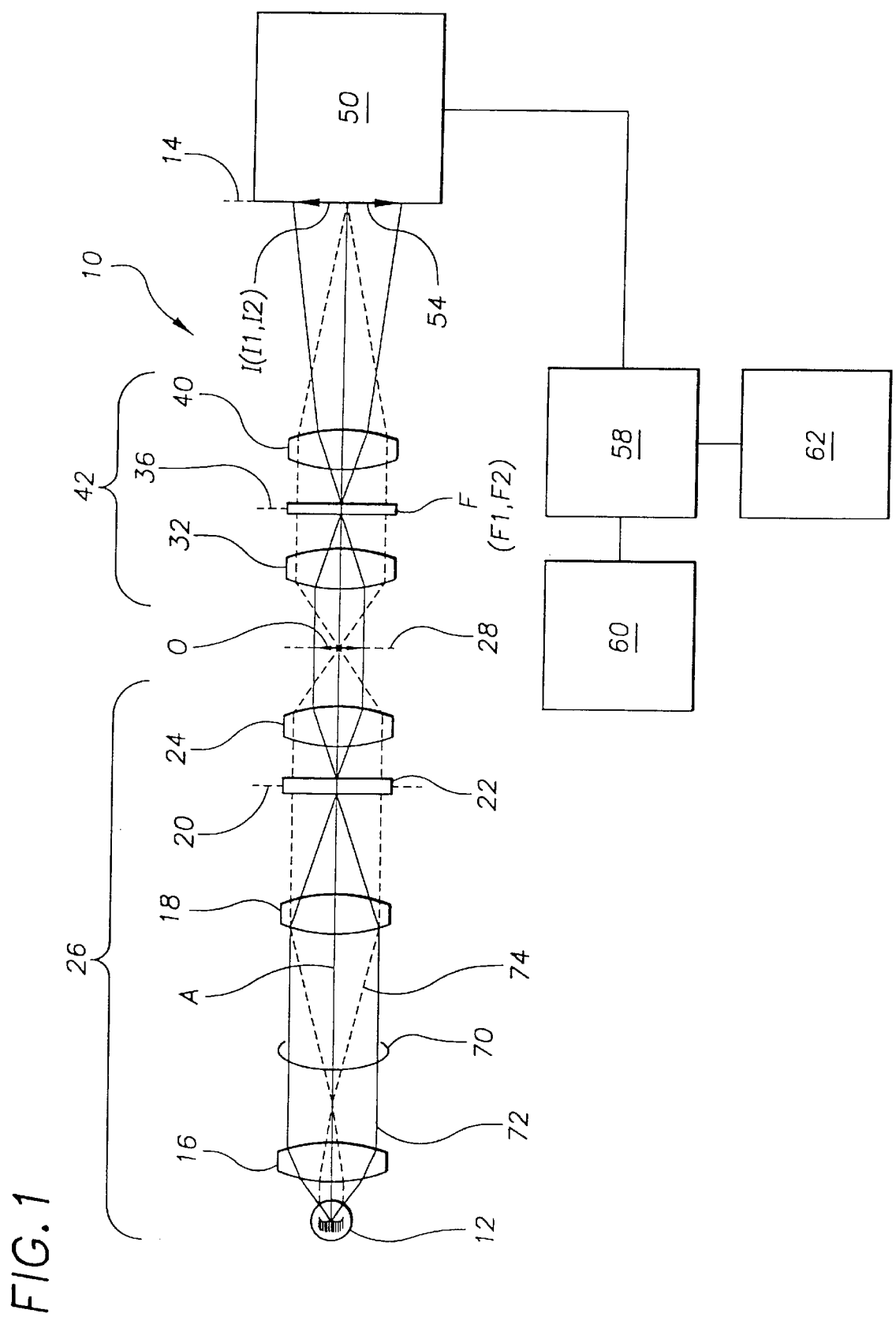
FIG. 1 is a schematic optical diagram of the configuration of a first embodiment of the optical apparatus according to the present invention.

With reference to FIG. 1, optical apparatus 10 includes a light source 12 for supplying illumination light. Proceeding from light source 12 toward an image plane 14 along optical axis A, apparatus 10 further comprises a collector lens 16, a field lens 18, an aperture stop 22, and a condenser lens 24. Elements 12–24 constitute an illumination optical system 26 which provides illumination for an object O placed at an object plane 28. Adjacent object plane 28 is an objective lens 32, a transform plane 36 in which is arranged a pupil modulation filter F (or multiple pupil modulation filters F1 and F2), and an imaging lens 40. Objective lens 32, transform plane 36, and imaging lens 40 constitute an objective optical system 42.

Transform plane 36 is located at the aperture position of objective optical system 42. As discussed below, transform plane 36 is the position where the diffracted image (i.e., the diffraction pattern) of object O located at object plane 28 is formed by objective lens 32. In other words, transform plane 36 is the Fourier transform plane associated with object plane 28. The configuration and action of pupil modulation filter F is explained in greater detail below.

Adjacent imaging lens 40 is a detector 50 having a detection surface 54, such as a CCD array. Electrically connected to detector 50 is an image synthesis system (i.e., image synthesizer) 58. The latter is used to combine digital images captured by detection surface 54, as is known in the art. For example, a method of combining digital images to reduce noise and thereby improve contrast is described in the article by Shinya Inoue, entitled "Video Microscopy," Plenum Press, pp. 334–335 (1986). Image synthesizer 58 is electrically connected to a memory unit 60 and a monitor unit 62.

With continuing reference to FIG. 1, optical apparatus 10 operates as follows. Light source 12 emits a light beam 70 comprising light rays 72 and light rays 74. Light rays 72 and 74 are the marginal and principal rays, respectively, associated with illumination system 26. From object O onward, light ray 72 is the principal ray and light ray 74 is the marginal ray. These rays indicate where the image and transform planes are located. Light beam 70 is collected by collector lens 16 which directs the beam to field lens 18, which forms an image of light source 12 at aperture plane 20 in which is located an aperture stop 22. The latter limits the size of the light source image (not shown). The light from light beam 70 passing through aperture stop 20 is then condensed by condenser lens 24 to Köhler illuminate object O arranged in object plane 28.

Light from light beam 70 that passes through object O then proceeds to objective lens 32, which collects and directs the light through pupil modulation filter F having a first transmittance distribution T1. The light transmitted through pupil modulation filter F with transmittance distribution T1 then proceeds to imaging lens 40, which forms an image I1 of object O on detection surface 54 of detector 50. The latter converts image I1 to an electrical output signal which is supplied to image synthesizer 58, which is capable of synthesizing multiple images I detected by detector 50. The transmittance distribution of pupil modulation filter F is then changed from T1 to T2, and an image I2 is formed on detection surface 54 in like manner. Memory unit 60 stores multiple images I (i.e., images I1 and I2). Monitor 62 then displays the synthesized images.

Figure 2:
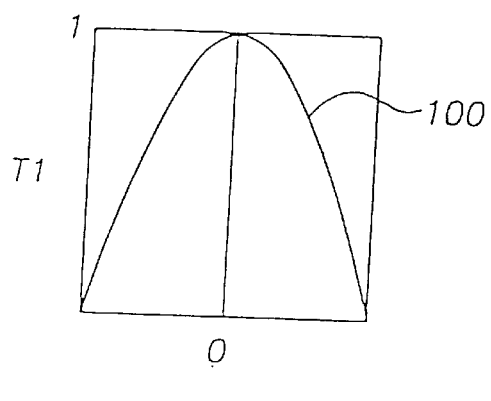
FIG. 2 is a plot of the transmittance distribution of a first pupil modulation filter, wherein the horizontal axis is the distance from the optical axis, and the vertical axis is the normalized transmittance.
Figure 3:
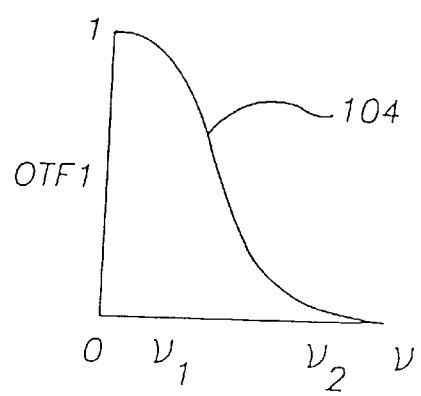
FIG. 3 is a plot of the OTF associated with the pupil modulation filter of FIG. 2, wherein the horizontal axis is in units of spatial frequency v, and the vertical axis is the modulation.
Figure 4:
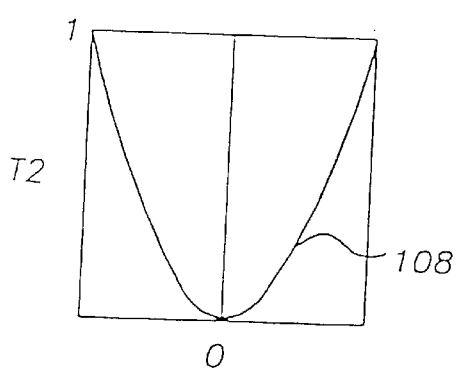
FIG. 4 is a plot of the transmittance distribution of a second pupil modulation filter, wherein the horizontal axis is the distance from the optical axis, and the vertical axis is the normalized transmittance.

With reference to FIGS. 2–6, the configuration and action of pupil modulation filter F is explained in greater detail. Referring to FIGS. 2–4, if a first pupil modulation filter F1 having a first transmittance distribution T1 (curve 100 in FIG. 2) is provided at transform plane 36 of objective optical system 42 (see FIG. 1), the resulting optical transfer function (OTF) is OTF1 (curve 104 in FIG. 3). Likewise, if a second pupil modulation filter F2 having a second transmittance distribution T2 (curve 108 in FIG. 4) is provided at transform plane 36 of objective optical system 42 (see FIG. 1), the resulting OTF is OTF2 (curve 110 in FIG. 5). For OTF1 (FIG. 3), it can be seen that the contrast at spatial frequencies about $v_1$ is improved, but the contrast at spatial frequencies about $v_2$ is degraded. Conversely, for OTF2 (FIG. 5), it can be seen that the contrast at spatial frequencies about $v_1$ is degraded, but the contrast at spatial frequencies about $v_2$ is improved.

Figure 5:
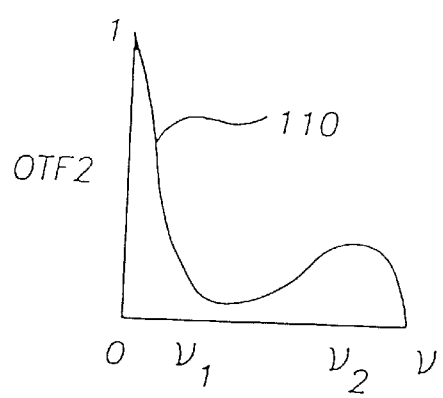
FIG. 5 is a plot of the OTF associated with the pupil modulation filter of FIG. 4, wherein the horizontal axis is in units of spatial frequency v, and the vertical axis is the modulation.
Figure 6:
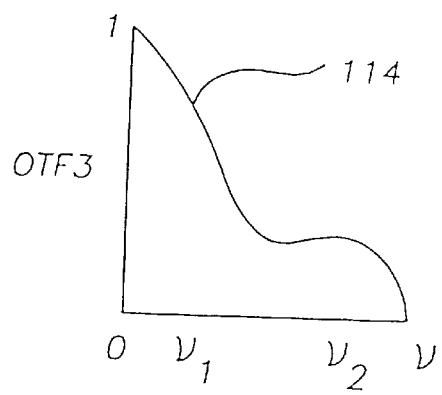
FIG. 6 is a plot of the OTF resulting from combining the transmittance distributions of FIGS. 2 and 4, wherein the horizontal axis is in units of spatial frequency v, and the vertical axis is the modulation.

Thus, with reference also to FIGS. 1 and 6, the present invention is capable of providing an image with improved contrast over a wide range of spatial frequencies, as follows. First, a first pupil modulation filter F1 with a first transmittance distribution T1 defining a first transmittance distribution state is arranged at transform plane 36 and a first image I1 is detected by detector 50. Then, a second pupil modulation filter F2 with a second transmittance distribution T2 defining a second transmittance distribution state is arranged at transform plane 36 and a second image I2 is detected by detector 50. Images I1 and I2 are then synthesized in image synthesizer 58. The resulting OTF is OTF3 with curve 114 (FIG. 6), which is the synthesis of OTF1 (FIG. 3) and OTF2 (FIG. 5). It can be seen from curve 114 of OTF3 that there is an improvement in the contrast for specific frequency characteristics as well as in the overall image characteristics.

As described above, image I1 is obtained through objective optical system 42 in the first transmittance distribution state. The contrast in the first spatial frequency range for image I1 about $v_1$ is improved, but the contrast at spatial frequencies about $v_2$ is degraded. Conversely, image I2 is obtained through objective optical system 42 in the second transmittance distribution state. The contrast in the second spatial frequency range of image I2 about $v_2$ is improved, but the contrast at other spatial frequencies about $v_1$ is degraded. In apparatus 10, the transmittance distributions of pupil modulation filters F1 and F2 are set such that the first spatial frequency range and the second spatial frequency range do not substantially overlap. Thus, a synthesized image can be obtained with improved contrast over the entire spatial frequency range. This improves the contrast for specific frequency characteristics as well as in the overall image characteristics.

Figure 7:
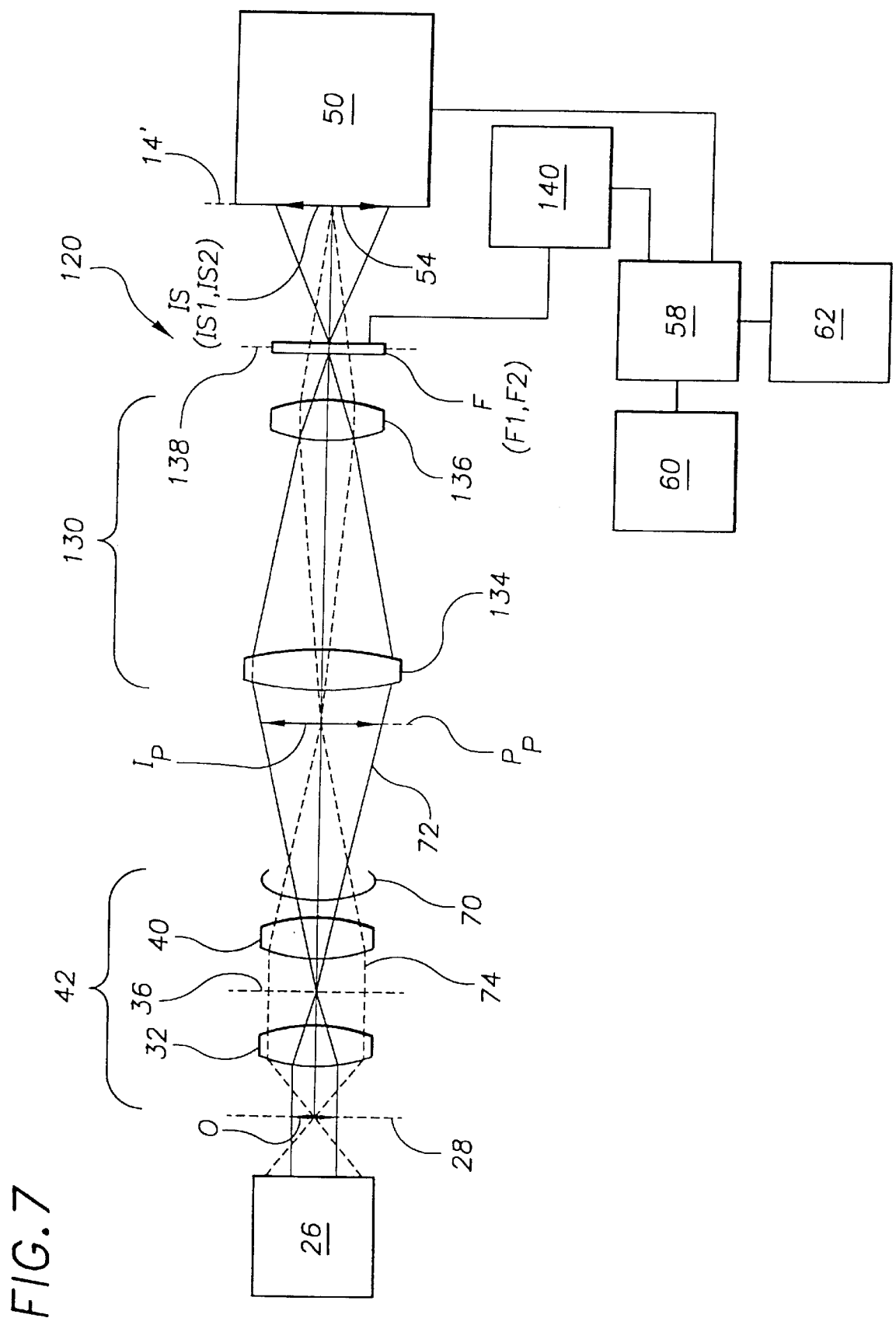
FIG. 7 is a schematic optical diagram of the configuration of a second embodiment of the optical apparatus of the present invention.

With reference now to FIG. 7, apparatus 120 has a configuration similar to that apparatus 10 of FIG. 1. Apparatus 120 differs from apparatus 100 in that a relay optical system 130 comprising lenses 134 and 136 is provided in the optical path between objective optical system 42 and detector 50. Further, the arrangement of pupil modulation filter F changes with the provision of relay optical system 130, and is now located at transform plane 138 between relay optical system 130 and detector 50. Transform plane 138 is conjugate to transform plane 36 in objective optical system 42. This arrangement is effective in cases where pupil modification filter F cannot be arranged in objective optical system 42. Apparatus 120 also includes illumination optical system 26, shown schematically.

With continuing reference to FIG. 7, light beam 70 (with light rays 72 and 74) originating from illumination system 26 passes through object O and proceeds toward objective optical system 42, which forms a primary (intermediate) image $I_p$ of object O at a primary image plane $P_p$. Light beam 70 continues from primary image $I_p$ and passes through relay optical system 130, which forms a secondary image IS at secondary image plane 14', in which is located surface 54 of detector 50.

In a preferred embodiment of the present invention, pupil modulation filter F is constituted such that it can be switched from a first transmittance distribution T1 (FIG. 2) to a second transmittance distribution T2 (FIG. 4). This may be achieved, for example, by constituting pupil modulation filter F of two filters F1 and F2 which may be selectively arranged in transform plane 138. Changing the transmittance distribution from T1 to T2 (e.g., by switching filters F1 and F2) creates images IS1 and IS2, as described above, which are respectively detected by detector 50. Images IS1 and IS2 are then synthesized in image synthesizer 58 to form a contrast-improved image, in the manner described above in connection with apparatus 10 of FIG. 1. The contrast-improved image has improved contrast for specific frequency characteristics as well as in the overall image characteristics.

In apparatus 10 and 120, two types of pupil modulation filters F (i.e., F1 and F2) having differing transmittance distributions T1 and T2 have been described for the purpose of illustrating the present invention. However, the number of types of pupil modulation filters used is not limited to two, and the transmittance distributions are not limited to T1 and T2 of FIGS. 2 and 4, respectively. In the present invention, it is preferable to variously change the characteristics and number of types of pupil modulation filters as needed.

With reference to FIG. 7, the present invention also preferably employs a switchable pupil modulation filter F capable of switching its transmittance from a first transmittance distribution to a second transmittance distribution (e.g., from T1 to T2). Such a filter may be an electrooptic device employing, for example, liquid crystals, wherein the device can electrically change the transmittance distribution through a control apparatus 140 electrically connected to pupil modulation filter F and to image synthesizer 58. In this case, pupil modulation is performed according to the type of specimen (i.e., object O) to be observed, thereby improving the image characteristics.

Figure 8:
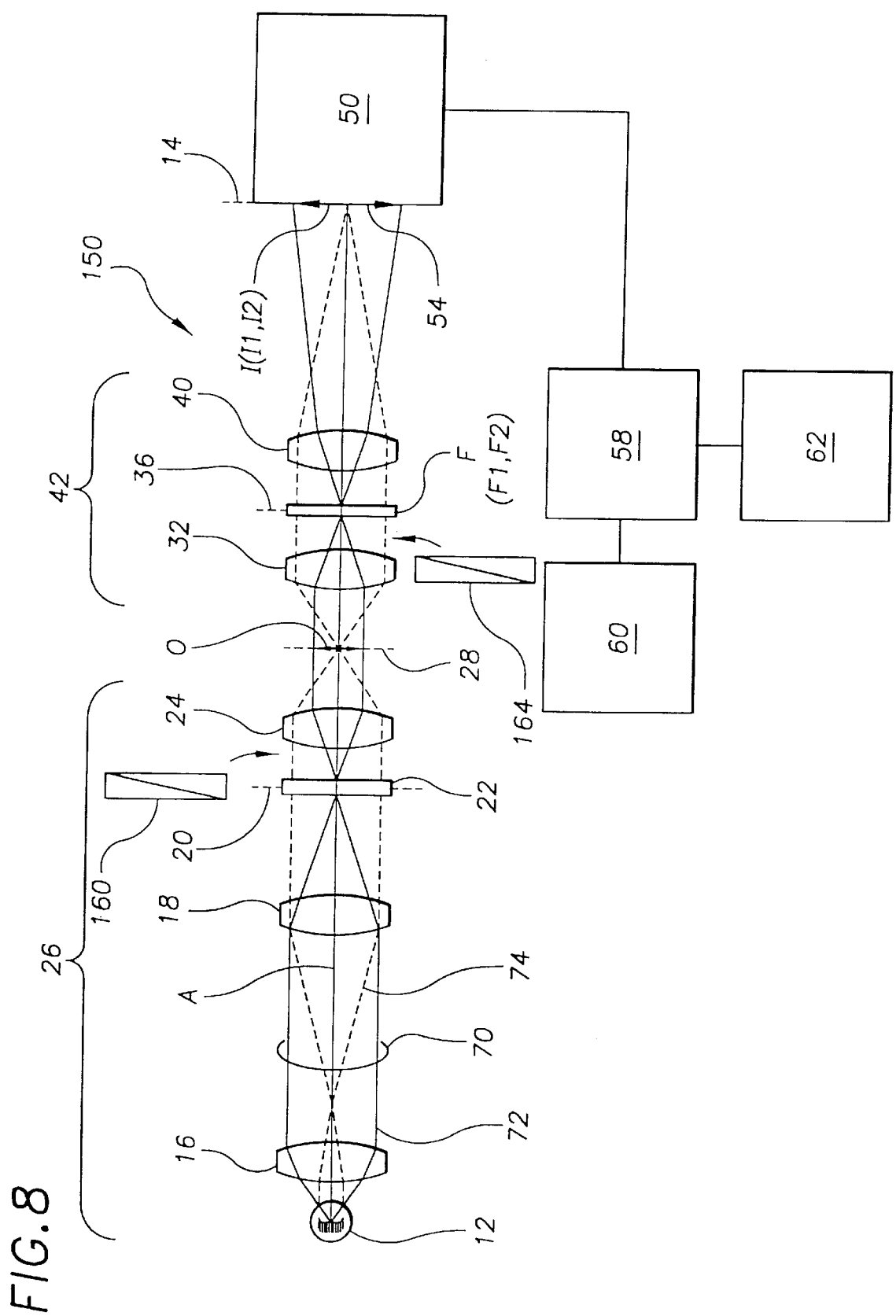
FIG. 8 is a schematic optical diagram of the configuration of a third embodiment of the optical apparatus according to the present invention similar to that of FIG. 1, but further including of one or more birefringent optical members.

With reference now to FIG. 8, apparatus 150 comprises the same elements of apparatus 10 of FIG. 1, and further includes one or more of birefringent optical members 160 and 164 arranged so as to cause differential interference. One or more of birefringent optical members 160 and 164 may also be employed in apparatus 120 (FIG. 7) in like manner. Birefringent optical members 160 and 164 may each be, for example, a Wollaston prism or similar optic comprising a birefringent crystal. In this manner, the present invention can be applied to a differential interference microscope for observing the qualitative form of microstructure in a specimen (e.g., object O). For example, the present invention may be applied to the microscope disclosed in U.S. Pat. No. 5,572,359, which patent is hereby incorporated by reference herein. The present invention is particularly effective for this application due to the high sensitivity of the differential interference image characteristics with respect to specific spatial frequencies in the specimen, and to the excellent effectiveness of the combined usage of pupil modulation filters.

While the present invention has been described in connection with preferred embodiments, it will be understood that it is not limited to those embodiments. On the contrary, it is intended to cover all alternatives, modifications, and equivalents as may be included within the spirit and scope of the invention as defined in the appended claims.

What is claimed is:

1. An optical apparatus for providing a contrast-improved image of an object, comprising:

means for illuminating the object;
  imaging means for forming an image of the object, said imaging means including a transform plane;
  pupil modulation means, arranged at said transform plane, for providing pupil modulation at first and second transmittance distributions to respectively form first and second images;
  a detector for detecting said first and second images; and
  image synthesis means, electronically connected to said detector, for synthesizing said first and second images to form the contrast-improved image.

2. An apparatus according to claim 1, wherein:

said imaging means includes
    an objective optical system with an aperture position and that forms a primary image of the object, and
    a relay optical system including said transform plane and a secondary image plane, said transform plane being conjugate to said aperture position; and
  said detector is arranged in said secondary image plane.

3. An apparatus according to claim 2, wherein said pupil modulation means comprises a first filter having said first transmittance distribution and a second filter having said second transmittance distribution, said first and second filters being selectively arrangeable in said transform plane.

4. An apparatus according to claim 3, wherein said pupil modulation means is an electrooptic element to change electrically from said first transmittance distribution to said second transmittance distribution.

5. An apparatus according to claim 3, wherein said imaging means further includes at least one birefringent optical member arranged to cause differential interference.

6. An apparatus according to claim 1, wherein said pupil modulation means comprises a first filter having said first transmittance distribution, and a second filter having said second transmittance distribution, said first and second filters being selectively arrangeable in said transform plane.

7. An apparatus according to claim 6, wherein said pupil modulation means is an electrooptic element to change electrically from said first transmittance distribution to said second transmittance distribution.

8. An apparatus according to claim 7, wherein:

said imaging means includes
    an objective optical system with an aperture position and that forms a primary image of the object, and a relay optical system including said transform plane and a secondary image plane, said transform plane being conjugate to said aperture position; and said detector is arranged in said secondary image plane.

9. An optical apparatus to generate a contrast-improved image of an object, comprising:

an illumination optical system, including a light source, that condenses light from said light source to illuminate the object;

an objective optical system adjacent to said illumination system and having a transform plane and an image plane;

a pupil modulation filter arranged at said transform plane and having a transmittance distribution to be adjusted from a first transmittance distribution to a second transmittance distribution to respectively form first and second images at said image plane;

a detector located at said image plane to detect said first and second images;

an image synthesizer electronically connected to said detector that synthesizes said first and second images to form the contrast-improved image.

10. An optical apparatus according to claim 9, wherein said pupil modulation filter comprises a first filter having said first transmittance distribution and a second filter having said second transmittance distribution, wherein said pupil modulation filter is designed such that said first and second filters are selectively arrangeable in said transform plane.

11. An optical apparatus according to claim 10, wherein said pupil modulation filter is an electrooptic element to change said transmittance distribution.

12. An optical apparatus according to claim 10, further including at least one birefringent optical member arranged to cause differential interference.

13. An optical apparatus to generate a contrast-improved image of an object, comprising:

an illumination optical system, including a light source, that condenses light from said light source to illuminate the object;

an objective optical system adjacent to said illumination system and having a primary image plane;

a relay optical system adjacent to said primary image plane and having a transform plane and a secondary image plane conjugate with said primary image plane;

a pupil modulating filter arranged at said transform plane and having a transmittance distribution to be adjusted from a first transmittance distribution to a second transmittance distribution, to respectively form first and second images at said image plane;

a detector located at said secondary image plane to detect said first and second images; and an image synthesizer electronically connected to said detector that synthesizes said first and second images to form the contrast-improved image.

14. An optical apparatus according to claim 13, further including at least one birefringent optical member arranged to cause differential interference.

15. An optical apparatus according to claim 13, wherein said pupil modulation filter comprises a first filter having said first transmittance distribution and a second filter having said second transmittance distribution, wherein said pupil modulation filter is designed such that said first and second filters are selectively arrangeable in said transform plane.

16. An optical apparatus according to claim 13, wherein said pupil modulation filter is an electrooptic element to change said transmittance distribution.

17. An optical apparatus according to claim 16, further including at least one birefringent optical member arranged to cause differential interference.

18. A method of forming a contrast-improved image of an object in an image-forming optical apparatus having a transform plane and an image plane, the method comprising:

illuminating the object and passing light from the object through the optical apparatus including through a first transmittance distribution created at the transform plane to form a first image of the object at the image plane;

detecting and storing said first image;

passing light from the object through the optical apparatus and including through a second transmittance distribution created at the transform plane to form a second image of the object at said image plane;

detecting and storing said second image; and synthesizing said first and second images to form the contrast-improved image.

19. A method according to claim 18, wherein said first and second transmittance distributions are created by selectively arranging first and second filters having said first and second transmittance distributions, respectively, at the transform plane.

20. A method according to claim 19, further comprising utilizing at least one birefringent optical member in the optical apparatus such that the optical apparatus to generate a differential interference image.

21. A method according to claim 19, further including, in illuminating the object and passing light:

forming a primary image at a primary image plane within the optical apparatus; and relaying said primary image through said transform plane and forming a secondary image at the image plane.

22. A method according to claim 18, wherein said first and second transmittance distributions are created by arranging an electrooptic element in the transform plane and modulating said electrooptic element.

23. A method according to claim 18, further including, in illuminating the object and passing light:

forming a primary image at a primary image plane within the optical apparatus; and relaying said primary image through said transform plane and forming a secondary image at the image plane.

24. A method according to claim 18, further comprising utilizing at least one birefringent optical member in the optical apparatus such that the optical apparatus to generate a differential interference image.

* * * * *